United States Patent
Zhang et al.

(10) Patent No.: US 12,184,382 B2
(45) Date of Patent: Dec. 31, 2024

(54) APPARATUS AND METHODS OF SIMULTANEOUS USER EQUIPMENT (UE) RECEIVE (RX) BEAM REFINEMENT

(71) Applicant: LENOVO (BEIJING) LIMITED, Beijing (CN)

(72) Inventors: Yi Zhang, Beijing (CN); Chenxi Zhu, Fairfax, VA (US); Bingchao Liu, Beijing (CN); Wei Ling, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 107 days.

(21) Appl. No.: 18/040,672

(22) PCT Filed: Aug. 6, 2020

(86) PCT No.: PCT/CN2020/107432
§ 371 (c)(1),
(2) Date: Feb. 6, 2023

(87) PCT Pub. No.: WO2022/027446
PCT Pub. Date: Feb. 10, 2022

(65) Prior Publication Data
US 2023/0370144 A1  Nov. 16, 2023

(51) Int. Cl.
*H04B 7/06* (2006.01)
*H04B 7/08* (2006.01)
(Continued)

(52) U.S. Cl.
CPC .......... *H04B 7/0695* (2013.01); *H04B 7/088* (2013.01); *H04L 5/0023* (2013.01); *H04L 5/0048* (2013.01); *H04L 25/0226* (2013.01)

(58) Field of Classification Search
CPC ..... H04B 7/0695; H04B 7/088; H04L 5/0023; H04L 5/0048; H04L 25/0226
See application file for complete search history.

(56) References Cited

U.S. PATENT DOCUMENTS

| | | | |
|---|---|---|---|
| 2021/0266898 A1* | 8/2021 | Cha ................. | H04W 24/10 |
| 2021/0359745 A1* | 11/2021 | Farag ............... | H04W 72/21 |
| 2023/0189270 A1* | 6/2023 | Matsumura ........ | H04B 7/06952 370/329 |

FOREIGN PATENT DOCUMENTS

| | | |
|---|---|---|
| EP | 2947835 A1 | 11/2015 |
| WO | 2018045028 A1 | 3/2018 |

OTHER PUBLICATIONS

International Search Report and Written Opinion dated Apr. 29, 2021 for International Application No. PCT/CN2020/107432.
(Continued)

*Primary Examiner* — Sophia Vlahos
(74) *Attorney, Agent, or Firm* — AMPACC Law Group, PLLC

(57) ABSTRACT

Apparatus and methods of enhanced CSI-RS resource configuration and transmission for simultaneous UE Rx beam refinement are disclosed. The apparatus includes: a receiver that receives Channel State Information Reference Signal (CSI-RS) configuration comprising one or more CSI-RS resource sets for Receive (Rx) beam refinement, the CSI-RS resource sets comprising a plurality of CSI-RS resources for transmission of a plurality of CSI-RSs that are Frequency-Division Multiplexed (FDMed), wherein the receiver further receives, simultaneously, the CSI-RSs based on one or more Quasi Co-Location (QCL) assumptions; a processor that performs a simultaneous Rx beam refinement corresponding to the CSI-RSs that are FDMed; and a transmitter that transmits a reporting according to a Channel State Information (CSI) reporting configuration.

18 Claims, 5 Drawing Sheets

(51) Int. Cl.
H04L 5/00 (2006.01)
H04L 25/02 (2006.01)

(56) References Cited

OTHER PUBLICATIONS

Samsung. "CSI-RS for Beam Management" 3GPP TSG RAN WG1 89 R1-1707971, May 19, 2017, pp. 1-7.
Zte et al. "On CSI-RS for CSI acquisition and beam management" 3GPP TSG RAN WG1 Meeting 91 R1-1719541, Dec. 1, 2017, pp. 1-8.
CATT. "L3 Mobility based on CSI-RS based Measurements" 3GPP TSG RAN WG1 NR Ad-Hoc#2 R1-1711576, Jun. 30, 2017, pp. 1-7.

* cited by examiner

APPARATUS AND METHODS OF SIMULTANEOUS USER EQUIPMENT (UE) RECEIVE (RX) BEAM REFINEMENT

CROSS REFERENCE TO RELATED APPLICATIONS

This application is a national phase entry of International Application No. PCT/CN2020/107432, filed on Aug. 6, 2020, which is incorporated by reference in its entirety.

FIELD

The subject matter disclosed herein relates generally to wireless communication and more particularly relates to, but not limited to, apparatus and methods of enhanced Channel State Information Reference Signal (CSI-RS) resource configuration and transmission for simultaneous User Equipment (UE) Receive (Rx) beam refinement.

BACKGROUND

The following abbreviations and acronyms are herewith defined, at least some of which are referred to within the specification:

Third Generation Partnership Project (3GPP), 5th Generation (5G), New Radio (NR), 5G Node B/generalized Node B (gNB), Long Term Evolution (LTE), LTE Advanced (LTE-A), E-UTRAN Node B/Evolved Node B (eNB), Universal Mobile Telecommunications System (UNITS), Worldwide Interoperability for Microwave Access (WiMAX), Evolved UNITS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Physical Downlink Control Channel (PDCCH), Physical Downlink Shared Channel (PDSCH), Physical Broadcast Channel (PBCH), Bandwidth Part (BWP), Code-Division Multiplexing (CDM), Channel State Information (CSI), Channel State Information Reference Signal (CSI-RS), Frequency-Division Multiplexing (FDM), Frequency Division Multiple Access (FDMA), Identification (ID), Information Element (IE), Physical Resource Block (PRB), Radio Resource Control (RRC), Reference Signal (RS), Reference Signal Received Power (RSRP), Signal-to-Interference-Plus-Noise Ratio (SINR), Time-Division Multiplexing (TDM), Transmit Receive Point (TRP), Component Carrier (CC), Frequency Range 1 (FR1), Frequency Range 2 (FR2), Layer 1 Reference Signal Received Power (L1-RSRP), (NZP-CSI-RS), Reference Symbol (RS), Synchronization Signal (SS), Transmission Configuration Indication (TCI), Technical Specification (TS), Quasi Co-Location (QCL), CSI-RS Resource Indicator (CRI), Non-Zero Power CSI-RS (NZP CSI-RS), Layer 1 Signal-to-Interference-Plus-Noise Ratio (L1-SINR), Frequency-Division Multiplexed (FDMed), Time-Division Multiplexed (TDMed).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs (Transmit Receive Points) are studied. A TRP is an apparatus to transmit and receive signals, and is controlled by a gNB through the backhaul between the gNB and the TRP. A TRP may also be referred to as a transmitting-receiving identity, or simply an identity.

In current NR system, Physical Downlink Control Channel (PDCCH) is transmitted from a single TRP. With multiple TRPs, time-frequency resources for PDCCH transmission may be from multiple TRPs. The spatial diversity may be exploited in addition to the time-frequency diversity. Enhanced Physical Downlink Control Channel (E-PDCCH) allows exploitation of the additional resources to improve PDCCH transmission reliability and robustness. Multiple transmissions of the E-PDCCH may be transmitted from a same TRP or some different TRPs.

Beam management related enhancements for simultaneous multi-TRP transmission with multi-panel reception are desirable.

SUMMARY

Apparatus and methods of enhanced CSI-RS resource configuration and transmission for simultaneous UE Rx beam refinement are disclosed.

According to a first aspect, there is provided an apparatus, including: a receiver that receives Channel State Information Reference Signal (CSI-RS) configuration comprising one or more CSI-RS resource sets for Receive (Rx) beam refinement, the CSI-RS resource sets comprising a plurality of CSI-RS resources for transmission of a plurality of CSI-RSs that are Frequency-Division Multiplexed (FDMed), wherein the receiver further receives, simultaneously, the CSI-RSs based on one or more Quasi Co-Location (QCL) assumptions; a processor that performs a simultaneous Rx beam refinement corresponding to the CSI-RSs that are FDMed; and a transmitter that transmits a reporting according to a Channel State Information (CSI) reporting configuration.

According to a second aspect, there is provided an apparatus, including: a transmitter that transmits Channel State Information Reference Signal (CSI-RS) configuration comprising one or more CSI-RS resource sets for Receive (Rx) beam refinement, the CSI-RS resource sets comprising a plurality of CSI-RS resources for transmission of a plurality of CSI-RSs that are Frequency-Division Multiplexed (FDMed), wherein the transmitter further transmits, simultaneously, the CSI-RSs based on one or more Quasi Co-Location (QCL) assumptions; and a receiver that receives a reporting according to a Channel State Information (CSI) reporting configuration; wherein a simultaneous Rx beam refinement is performed corresponding to the CSI-RSs that are FDMed.

According to a third aspect, there is provided a method, including: receiving, by a receiver, Channel State Information Reference Signal (CSI-RS) configuration comprising one or more CSI-RS resource sets for Receive (Rx) beam refinement, the CSI-RS resource sets comprising a plurality of CSI-RS resources for transmission of a plurality of CSI-RSs that are Frequency-Division Multiplexed (FDMed); receiving, by the receiver, simultaneously, the CSI-RSs based on one or more Quasi Co-Location (QCL) assumptions; performing, by a processor, a simultaneous Rx beam refinement corresponding to the CSI-RSs that are FDMed; and transmitting, by a transmitter, a reporting according to a Channel State Information (CSI) reporting configuration.

According to a fourth aspect, there is provided a method, including: transmitting, by a transmitter, Channel State Information Reference Signal (CSI-RS) configuration comprising one or more CSI-RS resource sets for Receive (Rx) beam refinement, the CSI-RS resource sets comprising a plurality of CSI-RS resources for transmission of a plurality of CSI-RSs that are Frequency-Division Multiplexed (FDMed); transmitting, by the transmitter, simultaneously, the CSI-RSs based on one or more Quasi Co-Location (QCL) assumptions; and receiving, by a receiver, a reporting according to a Channel State Information (CSI) reporting configuration; wherein a simultaneous Rx beam refinement is performed corresponding to the CSI-RSs that are FDMed.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
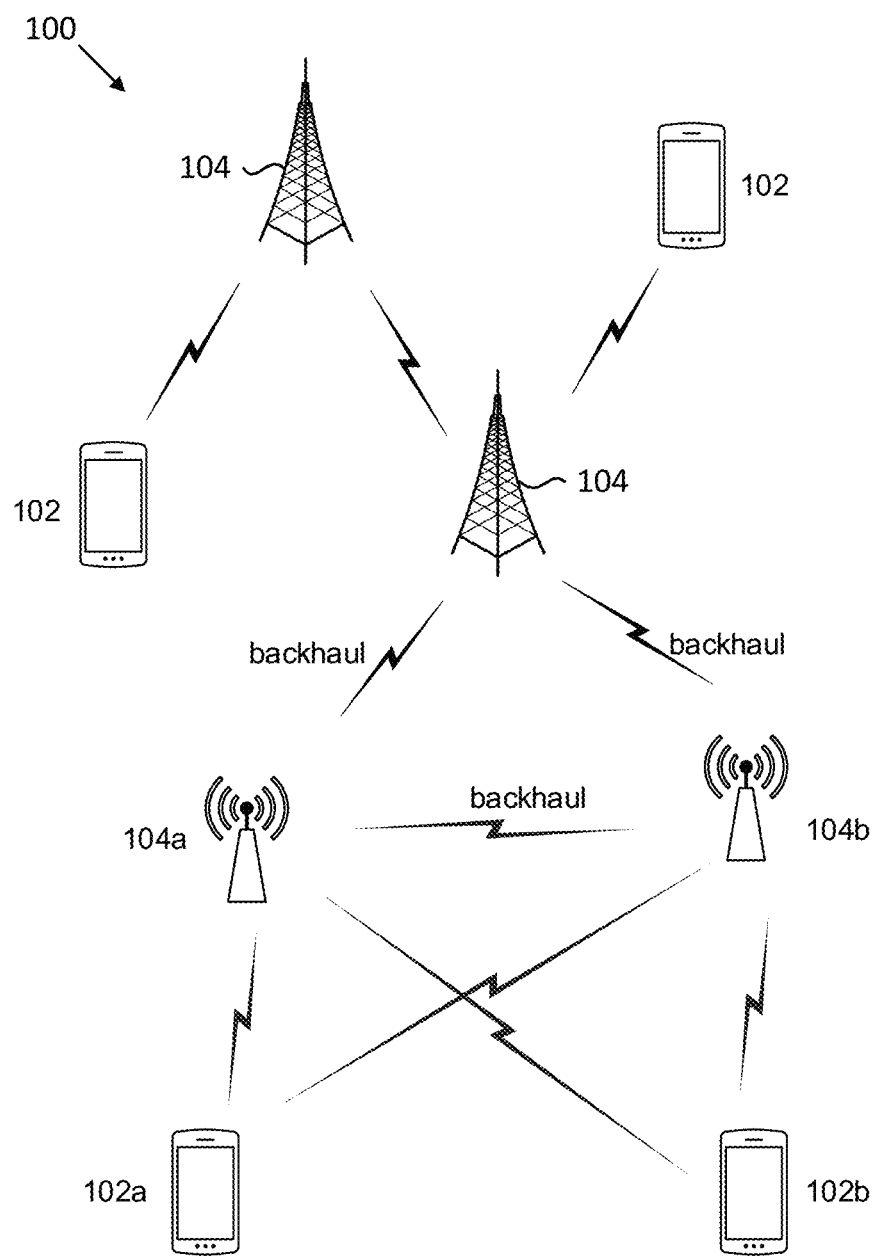
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function (s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported.

Figure 2:
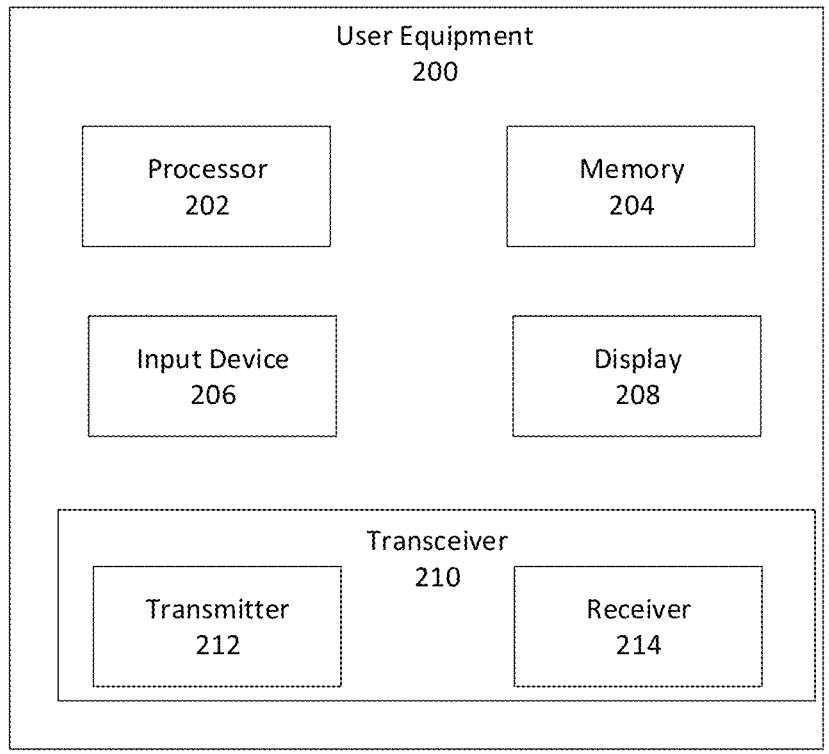
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
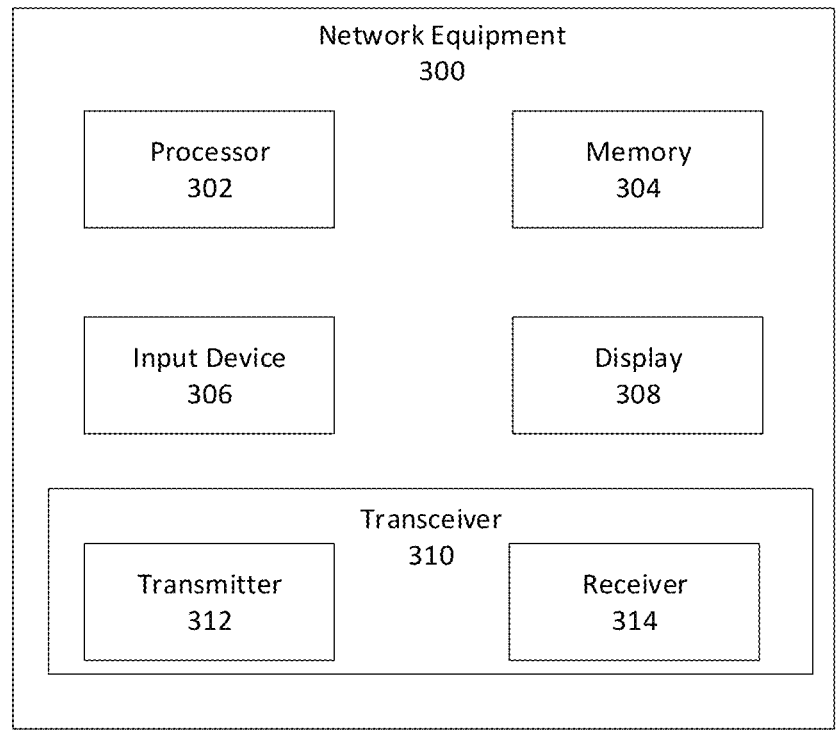
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

In Release15 NR system, only one Tx beam is supported and there is no CRI (CSI-RS resource index) reporting during UE Rx beam refinement. However, with multiple TRPs for gNB and multiple panels for UE, a UE may make receive beam refinement simultaneous for multiple transmit beams from multiple TRPs. Simultaneous multiple Rx beam refinement may bring one or more of the following benefits.

Beam refinement latency may be reduced. It is valuable if UE makes fast rotation. In this case, it is beneficial to keep track of Rx beam change.

Scheduling restriction may be reduced, and/or PDSCH transmission efficiency may be improved. The transmit beams may be different for CSI-RS transmission for one UE Rx beam refinement and PDSCH transmission for another UE in one slot. It has scheduling restriction with the same transmit beam in the same OFDM symbol for typical wideband beamforming. With simultaneous Rx beam refinement, the slot or OFDM number with this restriction will be reduced. For example, the slot/OFDM number with this restriction is halved in the case where Rx beam refinement is performed simultaneously for 2 Tx beams from 2 TRPs. From another view, PDSCH transmission efficiency may be improved in the case where different transmit beams for one UE Rx beam refinement and PDSCH transmission for another UE are in one slot since it is not feasible for multiplexing in the same OFDM symbol.

Rx beam refinement may be more accurate. The interference between Rx beams associated with multiple simultaneous transmitted Tx beams may be measured and taken into account in Rx beam selection. Joint Rx beam refinement is possible since multiple Rx beam refinements are made in the same OFDM symbol. From this view, the Rx beam selection may be relatively more accurate.

NZP-CSI-RS-ResourceSet may be configured for Rx beam refinement. In Release 15, it was specified in TS 38.214 as follows.

If a UE is configured with a NZP-CSI-RS-ResourceSet configured with the higher layer parameter repetition set to 'on', the UE may assume that the CSI-RS resources within the NZP-CSI-RS-ResourceSet are transmitted with the same downlink spatial domain transmission filter, where the CSI-RS resources in the NZP-CSI-RS-ResourceSet are transmitted in different OFDM symbols.

If the UE is configured with a CSI-ReportConfig with reportQuantity set to "cri-RSRP", "cri-SINR" or "none" and if the CSI-ResourceConfig for channel measurement (higher layer parameter resourcesForChannelMeasurement) contains a NZP-CSI-RS-ResourceSet that is configured with the higher layer parameter repetition and without the higher layer parameter trs-Info, the UE can only be configured with the same number (1 or 2) of ports with the higher layer parameter nrofPorts for all CSI-RS resources within the set.

If the UE is configured with the CSI-RS resource in the same OFDM symbol(s) as a Synchronization Signal/Physical Broadcast Channel (SS/PBCH) block, the UE may assume that the CSI-RS and the SS/PBCH block are quasi co-located with 'QCL-TypeD' if 'QCL-TypeD' is applicable.

According to the above configuration, NZP-CSI-RS-ResourceSet with higher layer parameter repetition set to 'on' is configured for UE Rx beam refinement, where CSI-RS resources in the set are assumed to be transmitted with same downlink spatial domain transmission filter and in different OFDM symbols.

For CSI-RS resources in a CSI-RS resource set, it was defined in TS38.214 as follows.

The following parameters for which the UE shall assume non-zero transmission power (NZP) for CSI-RS resource are configured via the higher layer parameter NZP-CSI-RS-Resource, CSI-ResourceConfig and NZP-CSI-RS-ResourceSet for each CSI-RS resource configuration:

nzp-CSI-RS-ResourceID determines CSI-RS resource configuration identity.
  periodicityAndOffset defines the CSI-RS periodicity and slot offset for periodic/semi-persistent CSI-RS. All the CSI-RS resources within one set are configured with the same periodicity, while the slot offset can be same or different for different CSI-RS resources.
  resourceMapping defines the number of ports, CDM-type, and OFDM symbol and subcarrier occupancy of the CSI-RS resource within a slot.
  nrofPorts in resourceMapping defines the number of CSI-RS ports.
  density in resourceMapping defines CSI-RS frequency density of each CSI-RS port per PRB, and CSI-RS PRB offset in case of the density value of ½. For density ½, the odd/even PRB allocation indicated in density is with respect to the common resource block grid.
  cdm-Type in resourceMapping defines CDM values and pattern.
  powerControlOffset: which is the assumed ratio of PDSCH EPRE to NZP CSI-RS EPRE when UE derives CSI feedback and takes values in the range of [−8, 15] dB with 1 dB step size.
  powerControlOffsetSS: which is the assumed ratio of NZP CSI-RS EPRE to SS/PBCH block EPRE.
  scramblingID defines scrambling ID of CSI-RS with length of 10 bits.
  BWP-Id in CSI-ResourceConfig defines which bandwidth part the configured CSI-RS is located in.
  repetition in NZP-CSI-RS-ResourceSet is associated with a CSI-RS resource set and defines whether UE can assume the CSI-RS resources within the NZP CSI-RS Resource Set are transmitted with the same downlink spatial domain transmission filter or not, and can be configured only when the higher layer parameter reportQuantity associated with all the reporting settings linked with the CSI-RS resource set is set to 'cri-RSRP', 'cri-SINR' or 'none'.
  qcl-InfoPeriodicCSI-RS contains a reference to a TCI-State indicating QCL source RS(s) and QCL type(s). If the TCI-State is configured with a reference to an RS with 'QCL-TypeD' association, that RS may be an SS/PBCH block located in the same or different CC/DL BWP or a CSI-RS resource configured as periodic located in the same or different CC/DL BWP.
  trs-Info in NZP-CSI-RS-ResourceSet is associated with a CSI-RS resource set and for which the UE can assume that the antenna port with the same port index of the configured NZP CSI-RS resources in the NZP-CSI-RS-ResourceSet is the same, and can be configured when reporting setting is not configured or when the higher layer parameter reportQuantity associated with all the reporting settings linked with the CSI-RS resource set is set to 'none'.

All CSI-RS resources within one set are configured with same density and same nrofPorts, except for the NZP CSI-RS resources used for interference measurement.

According to the above configuration, for each CSI-RS resource in the CSI-RS resource set with repetition "on", it can be independently configured with parameters such as periodicityAndOffset, resourceMapping, etc.

Figure 4:
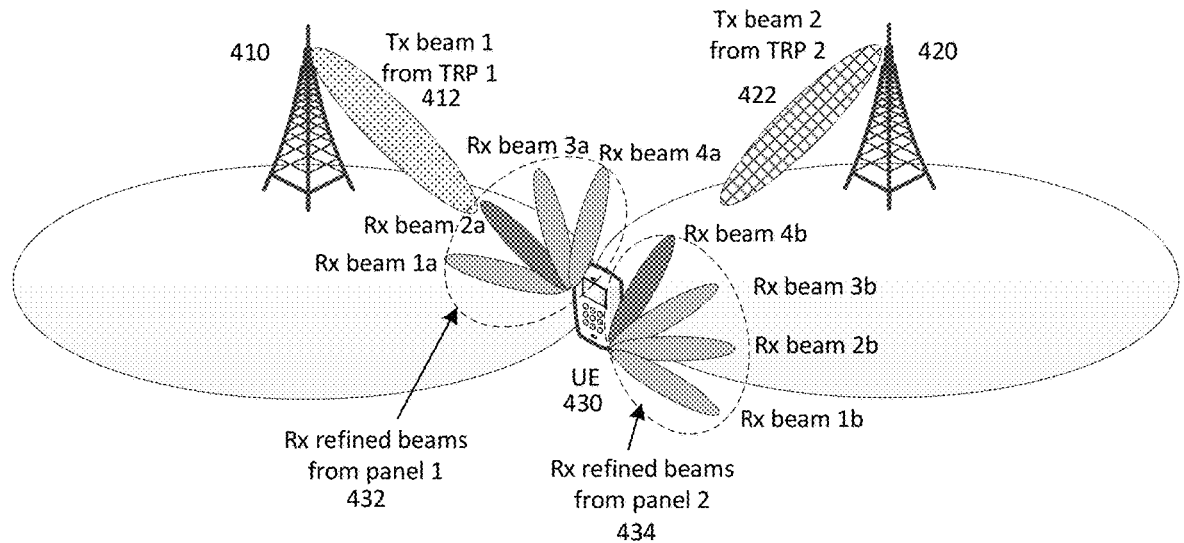
FIG. 4 is a schematic diagram illustrating an example of simultaneous Rx beam refinement for multiple simultaneous Transmit (Tx) beams from multiple TRPs in accordance with some implementations of the present disclosure.

With multiple TRP simultaneous transmission, a UE needs to perform Rx beam refinement based on Tx beams from multiple TRPs. FIG. 4 is a schematic diagram illustrating an example of simultaneous Rx beam refinement for multiple simultaneous Tx beams from multiple TRPs in accordance with some implementations of the present disclosure. In the example, a UE 430 with 2 panels (e.g., panel 1 and panel 2) may perform simultaneous Rx beam refinement for 2 Tx beams (e.g., Tx beam 1 412 and Tx beam 2 422) from 2 TRPs (e.g., TPR 1 410, TRP 2 420). Simultaneous Rx beam refinement may reduce the time required for multiple Rx beam refinement; reduce slot/OFDM symbol number with scheduling restriction for PDSCH transmission with the same Tx beam for Rx beam refinement; and support joint Rx beam refinement with more accurate refinement result due to the fact that the interaction between simultaneous receiving multiple beams and simultaneous transmission for multiple Tx beams is taken into account. Enhanced CSI-RS resource configuration and transmission schemes are proposed to support simultaneous Rx beam refinement. FDMed CSI-RS resources in one or multiple CSI-RS resource sets are configured for simultaneous Rx beam refinement, where one CSI-RS on FDMed CSI-RS resources is transmitted with one Tx beam from one TRP. Based on these transmitted CSI-RSs, the UE makes simultaneous Rx beam refinement for multiple beams from multiple TRPs.

CSI-RS Resource Set With FDMed CSI-RSs in CSI-RS Resource Groups

In Release 15, only TDMed CSI-RS resources are used in a CSI-RS resource set for UE Rx beam refinement. To support simultaneous Rx beam refinement to obtain the abovementioned benefits, FDMed CSI-RS resources may be imported in the configured CSI-RS resource set.

Figure 5:
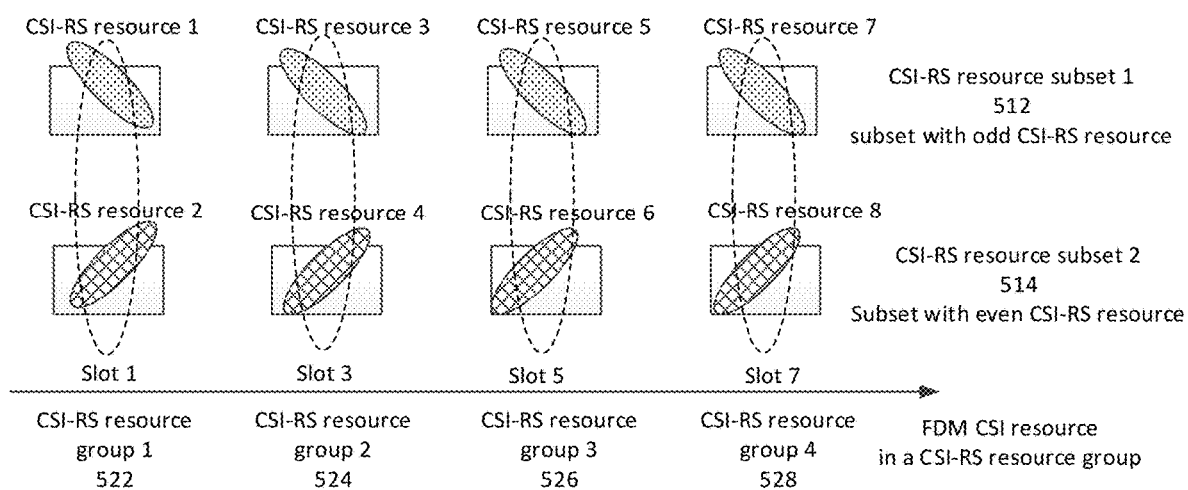
FIG. 5 is a schematic diagram illustrating an example of FDMed CSI-RS resources in a CSI-RS resource set for Rx beam refinement in accordance with some implementations of the present disclosure.

FIG. 5 is a schematic diagram illustrating an example of FDMed CSI-RS resources in a CSI-RS resource set for Rx beam refinement in accordance with some implementations of the present disclosure.

As shown in FIG. 5, eight CSI-RS resources 1 to 8 are grouped into four CSI-RS resource groups, i.e. CSI-RS resource group 1 522, CSI-RS resource group 2 524, CSI-RS resource group 3 526, and CSI-RS resource group 4 528. In each CSI-RS resource group, e.g. group 1 522, CSI-RSs transmitted on the CSI-RS resources 1 and 2 are FDMed, and each CSI-RS in the group is transmitted from one TRP.

A CSI-RS resource subset is defined as the set of CSI-RS with the same index in the CSI-RS resource groups. In the example shown in FIG. 5, CSI-RS resource subset 1 512 consists of CSI-RS resources 1, 3, 5, and 7; CSI-RS resource subset 2 514 consists of CSI-RS resources 2, 4, 6, and 8. That is, CSI-RS resources 1, 3, 5, and 7 have the same index (e.g., 1) in the respective CSI-RS resource groups; and RS resources 2, 4, 6, and 8 have the same index (e.g., 2) in the respective CSI-RS resource groups. The CSI-RS resources in the same CSI-RS resource subset are TDMed. A same Tx beam may be assumed in each CSI-RS resource subset. In this example, the TDM is based on slot level, and in some other examples, it may also be based on symbol level.

To implement the CSI-RS resource group, two exemplary alternative approaches may be used.

In a first alternative, an additional RRC signaling, i.e. nzp-CSI-RS-ResourceGroupIndex-r17, may be included in each NZP-CSI-RS-Resource, which is an optional signaling used for CSI-RS for simultaneous Rx beam refinement, as shown in the information element (IE) below. The newly introduced part is marked in bold.

field and the firstOFDMSymbolInTimeDomain field of CSI-RS-ResourceMapping are expected to be configured for NZP-CSI-RS resources within the same CSI-RS resource group. The maximum CSI-RS resource group number in a CSI-RS resource set may be defined by maxNrofNZP-CSI-RS-ResourcegroupsPerSet. This maximum value may be determined based on UE capability for refined Rx beam number.

In a second alternative, an embedded structure may be used directly. In the embedded structure, a plurality of CSI-RS resource groups constitute a CSI-RS resource set, and a plurality of CSI-RS resources constitute a CSI-RS resource group. The structure of the CSI-RS resource group may be introduced.

Because one Tx beam is used on CSI-RS resources in one CSI-RS resource subset, one new state (or value) for the parameter 'repetition' may be introduced as 'partial on' for CSI-RS resource set, which means that the same Tx beam is assumed only for CSI-RS resources in the same CSI-RS resource subset, but the same Tx beam is not assumed for CSI-RS resources among CSI-RS resource subsets. Thus, the UE is able to perform beam refinement in each CSI-RS resource subset for one Tx beam from one TRP. The new field, i.e. nzp-CSI-RS-ResourceGroupindex-r17, is only valid for the CSI-RS resources with the value of 'repetition' of its associated CSI-RS resource set as 'partial on'.

For CSI reporting, reportQuantity of a CSI-ReportConfig can be set to "cri-RSRP", "cri-SINR" or "none", where CSI-ResourceConfig can be configured as the described CSI-RS resource set and is used for resourcesForChannel-Measurement in CSI-ReportConfig. When "none" is set for reporting, there is no need for reporting. When "cri-RSRP" or "cri-SINR" is set for reporting, similar group based beam reporting can be used, where one L1-RSRP or L1-SINR is reported based on CSI-RS resources in one CSI-RS resource subset, i.e. CSI-RSs with the same index in each CSI-RS resource group. The CSI-RS index in the group (or CSI-RS resource group related index) may also be reported with the corresponding L1-RSRP or L1-SINR.

CSI-RS Resource Set Consisting of Enhanced CSI-RS Resources With Multiple QCL Information For Release 15, only port number 1 or 2 can be configured for CSI-RSs for Rx beam refinement, and the same QCL information is assumed for one CSI-RS resource. To support

---

Updated NZP-CSI-RS-Resource information element

```
NZP-CSI-RS-Resource ::=                      SEQUENCE {
   nzp-CSI-RS-ResourceId                        NZP-CSI-RS-ResourceId,
   resourceMapping                              CSI-RS-ResourceMapping,
   powerControlOffset                           INTEGER (-8..15),
   powerControlOffsetSS                         ENUMERATED{db-3, db0, db3, db6}
OPTIONAL, -- Need R
   scramblingID                                 ScramblingId,
   periodicityAndOffset                         CSI-ResourcePeriodicityAndOffset
OPTIONAL, -- Cond PeriodicOrSemiPersistent
   qcl-InfoPeriodicCSI-RS                       TCI-StateId
OPTIONAL, -- Cond Periodic
   nzp-CSI-RS-ResourceGroupIndex-r17            INTEGER (0.. maxNrofNZP-CSI-RS-
ResourcegroupsPerSet-1)                            OPTIONAL,
   ...
}
maxNrofNZP-CSI-RS-ResourcegroupsPerSet-1     INTEGER ::= 3   -- Max number of
NZP-CSI-RS resource groups in a NZP-CSI-RS resource set minus 1
```

---

To guarantee FDM for CSI-RS resources in the CSI-RS resource group, same values for the periodicityAndOffset simultaneous Rx beam refinement, enhanced CSI-RS resource with larger CSI-RS port number and/or multiple QCL information (i.e., multiple QCL assumptions) may be imported or introduced, where there are multiple CSI-RS port groups for the enhanced CSI-RS resource. One CSI-RS port group of the enhanced CSI-RS may be transmitted with a beam from one TRP, and another CSI-RS port group may be transmitted with a beam from another TRP. For example, CSI-RS from port group 1 has one QCL assumption, and CSI-RS from port group 2 has another QCL assumption.

In some examples, the CSI-RS port group number may equal to the TRP number, and a typical value is 2. The CSI-RS port number in the port group may be 1 or 2, which is the same value as Release 15. One example of IE for CSI-RS port group configuration is shown below, where additional CSI-RS-PortGroup1 and CSI-RS-PortGroup2 are introduced to indicate CSI-RS port(s) in the group by string bitmap. For example, the bit in the string is set to '1' when the corresponding CSI-RS port is in that group, and it is set to '0' when the corresponding CSI-RS port is not in that group. Time-frequency resources (e.g. REs) for different CSI-RS port groups are FDMed.

| Updated NZP-CSI-RS-Resource information element | |
|---|---|
| NZP-CSI-RS-Resource ::= | SEQUENCE { |
| nzp-CSI-RS-ResourceId | NZP-CSI-RS-ResourceId, |
| resourceMapping | CSI-RS-ResourceMapping, |
| CSI-RS-PortGroup1 | BIT STRING (SIZE (4)), |
| CSI-RS-PortGroup2 | BIT STRING (SIZE (4)), |
| powerControlOffset | INTEGER (−8..15), |
| powerControlOffsetSS | ENUMERATED{db−3, db0, db3, db6} |
| OPTIONAL, -- Need R | |
| scramblingID | ScramblingId, |
| periodicityAndOffset | CSI-ResourcePeriodicityAndOffset |
| OPTIONAL, -- Cond PeriodicOrSemiPersistent | |
| qcl-InfoPeriodicCSI-RS | TCI-StateId |
| OPTIONAL, -- Cond Periodic | |
| ... | |
| } | |

Figure 6:
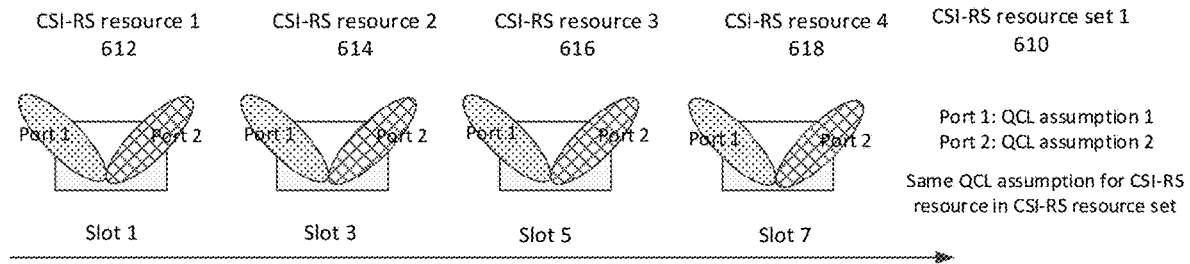
FIG. 6 is a schematic diagram illustrating an example of enhanced CSI-RS resources in a CSI-RS resource set for Rx beam refinement in accordance with some implementations of the present disclosure.

FIG. 6 is a schematic diagram illustrating an example of enhanced CSI-RS resources in a CSI-RS resource set for Rx beam refinement in accordance with some implementations of the present disclosure.

The CSI-RS resource set 1 610 includes four CSI-RS resources 1, 2, 3 and 4 (e.g., 612, 614, 616 and 618); and each CSI-RS resource includes CSI-RS from Port 1 with QCL assumption 1 and CSI-RS from Port 2 with QCL assumption 2. Ports 1 and 2 of CSI-RS resource 1 612 are used for Tx beams from a first TRP and a second TRP (e.g. TRP 1 410 and TRP 2 420 in FIG. 4), respectively. That is, CSI-RS from Port 1 with QCL assumption 1 and CSI-RS from Port 2 with QCL assumption 2 are FDMed.

In another example, 4 ports CSI-RS resource with fd-CDM2 may be used as an enhanced CSI-RS resource, where one port group with ports 1 and/or 2 are used for Tx beam transmission from one TRP (e.g. TRP 1 410 in FIG. 4), and another port group with ports 3 and/or 4 are used for Tx beam transmission from another TRP (e.g. TRP 2 420 in FIG. 4). The CSI-RS resources (612, 614, 616, and 618) in the CSI-RS resource set may be TDMed.

Since different beams are transmitted from different CSI-RS port groups, two QCL assumptions and corresponding two RSs may be imported for one CSI-RS. For example, two values of qcl-InfoPeriodicCSI-RS may serve as references for QCL indication, where a first qcl-InfoPeriodicCSI-RS may be used for deriving the QCL information linked with the first TRP, and a second qcl-InfoPeriodicCSI-RS, i.e. additional qcl-InfoPeriodicCSI-RS, may be used for deriving the QCL information linked with the second TRP. CSI resources in the CSI resource set are assumed to be transmitted with the same Tx beams from multiple TRPs. The UE will make simultaneous Rx beam refinement for multiple Tx beams transmitted on enhanced CSI-RS resources.

When reportQuantity of a CSI-ReportConfig is set to "none", there is no need for CSI reporting. When reportQuantity of a CSI-ReportConfig is set to "cri-RSRP", "cri-SINR", one or two L1-RSRP or L1-SINR may be reported for Rx beam refinement based on 2 Tx beams. In a first example, only one (1) L1-RSRP or L1-SINR is reported since it is for one CSI-RS resource. One L1-RSRP or L1-SINR may be derived based on an average of values for all CSI-RS ports. It may be reported without CRI reporting, similar to that in Release 15. In a second example, two L1-RSRP or L1-SINR are reported since it is for an enhanced CSI-RS resource, where more information about beam refinement results may be helpful for gNB's to schedule PDSCH and configure CSI-RS.

In some examples, one of the following two exemplary reporting schemes may be used. The first scheme is independent reporting. The second scheme is differential reporting, where the second value reported is a differential value between the second measured value and the first reported value. The second scheme may have the benefit of reducing feedback overhead and good compatibility of one or two reporting values. The CRI may not be reported, similar to that in Release 15, and the multiple L1-RSRP or L1-SINR may be concatenated according to corresponding CSI-RS port group index implicitly. Alternatively, the CSI-RS port group index (or CSI-RS resource group related index) may be reported together with its corresponding L1-RSRP or L1-SINR in some examples.

Multiple CSI-RS Resource Sets With Restriction of FDMed CSI-RS Resource Between Sets It was agreed that NR supports the configuration of single resource set with repetition="ON" for Rx beam management where a resource set is formed from multiple beam management CSI-RS resources and is contained within a CSI resource setting. This may be improved with joint Rx beam refinement based on simultaneous CSI-RS transmission with beams from multiple TRPs.

In one example, a joint CSI-RS resource set may be introduced, which consists of multiple CSI-RS resource sets (or CSI-RS resource settings), and each CSI-RS resource set is used for Rx beam refinement corresponding to one Tx beam from one TRP.

Figure 7:
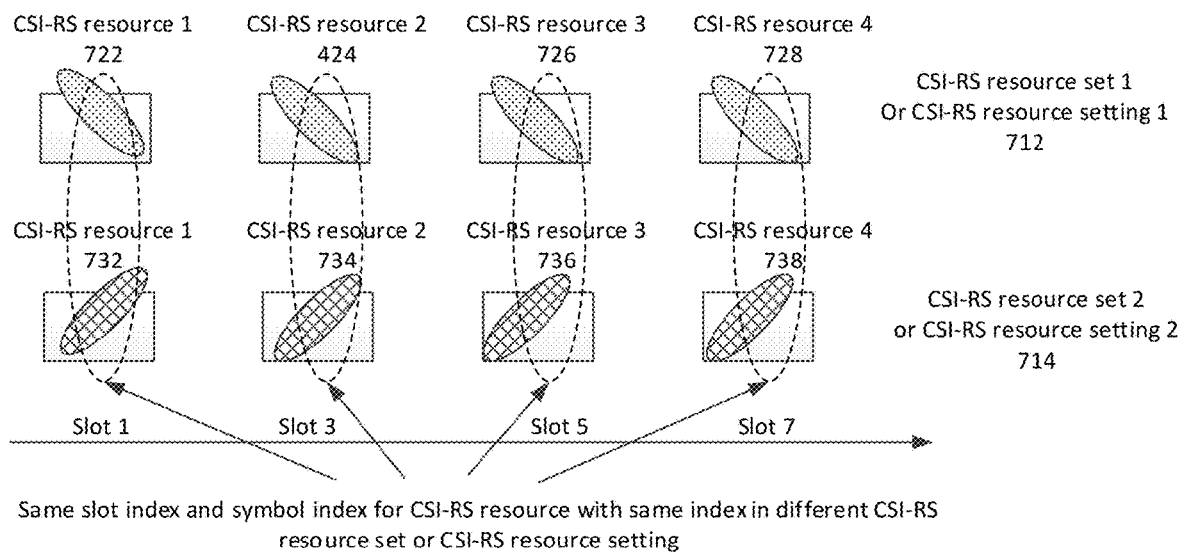
FIG. 7 is a schematic diagram of an example of multiple CSI-RS resource sets with restriction of FDMed CSI-RS resources between sets for Rx beam refinement in accordance with some implementations of the present disclosure.

FIG. 7 is a schematic diagram of an example of multiple CSI-RS resource sets with restriction of FDMed CSI-RS resources between sets for Rx beam refinement in accordance with some implementations of the present disclosure.

As shown in FIG. 7, the joint CSI-RS resource set consists of CSI-RS resource set 1 712 and CSI-RS resource set 2 714. Each CSI-RS resource set includes four CSI-RS resources 1, 2, 3, and 4. On account of independent configuration for each CSI-RS resource set, some restrictions for the CSI-RS resource set configuration may be required to support simultaneous Rx beam refinement. For example, the UE may not expect that the CSI-RS resources with a same index in each CSI-RS resource set are configured with different slots and/or OFDM symbols.

For example, as shown in FIG. 7, CSI-RS resource 1 722 in CSI-RS resource set 1 712 and CSI-RS resource 1 732 in CSI-RS resource set 2 714 are FDMed, and are not configured with different slot indexes and OFDM symbol indexes. That is, CSI-RS resource 1 722 and CSI-RS resource 732 should be configured with a same symbol in a same slot. The following parameters in the Information Elements (IEs) are expected to be configured with the same values: periodicityAndOffset in NZP-CSI-RS-Resource, nrofPorts and firstOFDMSymbol-InTimeDomain in CSI-RS-ResourceMapping. Additionally, the UE may not expect partial triggering of CSI-RSs on the CSI-RS resource sets. That is, all CSI-RSs on the CSI-RS resources in the joint CSI-RS resource set should be aperiodically triggered together, and part of the CSI-RSs on the CSI-RS resources in the joint CSI-RS resource set may not be aperiodically triggered.

In the example shown in FIG. 7, all CSI-RSs on the CSI-RS resource set 1 712 and CSI-RS resource set 2 714 (e.g. each pair of: CSI-RS resource 1 722 and 732, CSI-RS resource 2 724 and 734, CSI-RS resource 3 726 and 736, and CSI-RS resource 4 728 and 738) are always assumed to be aperiodically triggered simultaneously. When reportQuantity of a CSI-ReportConfig is set to "none", there is no need for CSI reporting. When L1-RSRP or L1-SINR for different CSI-RS resource sets is reported, L1-RSRP or L1-SINR is reported with concatenation according to the order of CSI-RS resource set index implicitly if no CRI or CSI-RS resource set index is reported. Alternatively, L1-RSRP or L1-SINR for each CSI-RS resource set may be reported together with its corresponding CSI-RS resource set index. Additionally, differential feedback on L1-RSRP or L1-SINR may be used. A CSI-RS resource group related index may be reported, which is CSI-RS resource set index for this case.

In another example, multiple CSI-RS resource settings may be imported where a non-zero power CSI-RS resource set with the Tx beam from one TRP is configured for one CSI-RS resource setting. Each CSI Resource Setting CSI-ResourceConfig contains a configuration of one (1) non-zero CSI resource set for UE Rx beam refinement corresponding to the Tx beam from one TRP. For CSI-ReportConfig, two resourcesForChannelMeasurement, including an additional one, may be linked with two configured CSI-RS resource settings. Similarly, the UE may not expect that the CSI-RS resources with the same index in each CSI-RS resource setting are configured with different slots and OFDM symbols. Additionally, the UE may not expect that only part of CSI-RSs on the CSI-RS resources in the two CSI-RS resource settings are aperiodically triggered. When reportQuantity of a CSI-ReportConfig is set to "none", there is no need for CSI reporting. When L1-RSRP or L1-SINR for different CSI-RS resource settings is reported, L1-RSRP or L1-SINR is reported with concatenation according to the order of CSI-RS resource setting index implicitly if no CRI or CSI-RS resource setting index is reported. Alternatively, L1-RSRP or L1-SINR for each CSI-RS resource setting may be reported together with its corresponding CSI-RS resource setting index. Additionally, differential feedback on L1-RSRP or L1-SINR may be used. A CSI-RS resource group related index may be reported, which is CSI-RS resource setting index for this case.

Figure 8:
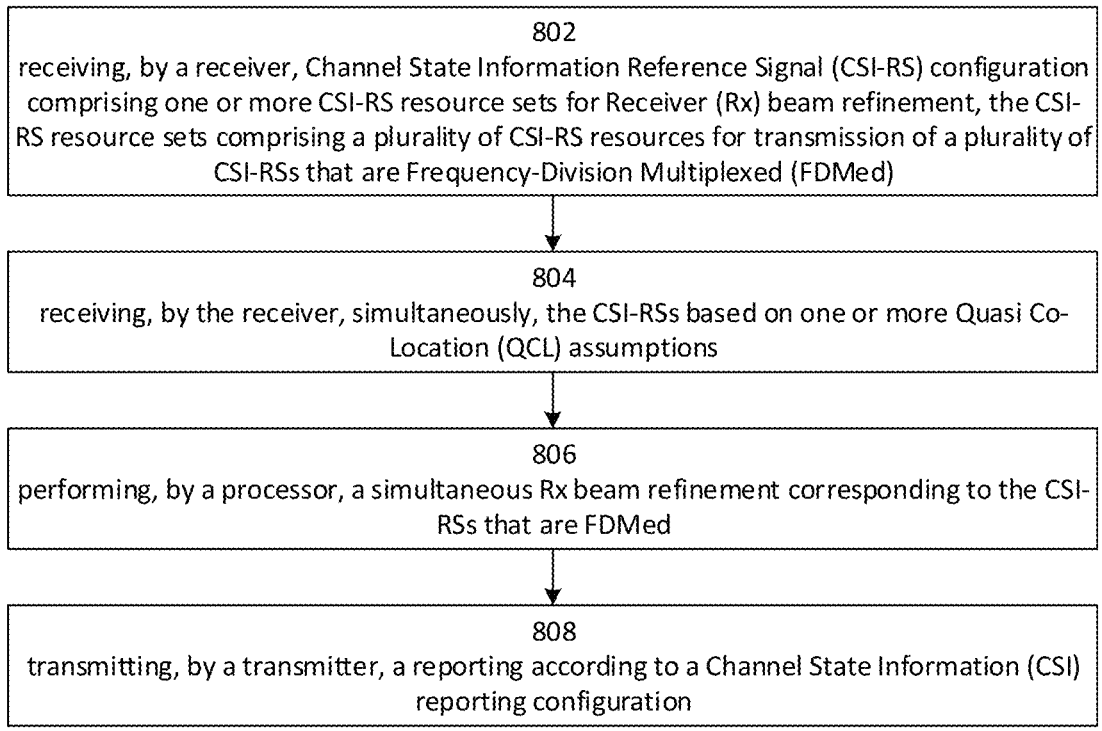
FIG. 8 is a flow chart illustrating steps of enhanced CSI-RS resource configuration and transmission for simultaneous UE Rx beam refinement by UE in accordance with some implementations of the present disclosure.

FIG. 8 is a flow chart illustrating steps of enhanced CSI-RS resource configuration and transmission for simultaneous UE Rx beam refinement by UE in accordance with some implementations of the present disclosure.

At step 802, the receiver 214 of UE 200 receives Channel State Information Reference Signal (CSI-RS) configuration comprising one or more CSI-RS resource sets for Receive (Rx) beam refinement, the CSI-RS resource sets comprising a plurality of CSI-RS resources for transmission of a plurality of CSI-RSs that are Frequency-Division Multiplexed (FDMed).

At step 804, the receiver 214 of UE 200 receives simultaneously, the CSI-RSs based on one or more Quasi Co-Location (QCL) assumptions.

At step 806, the processor 202 of UE 200 performs a simultaneous Rx beam refinement corresponding to the CSI-RSs that are FDMed.

At step 808, the transmitter 212 of UE 200 transmits a reporting according to a Channel State Information (CSI) reporting configuration.

Figure 9:
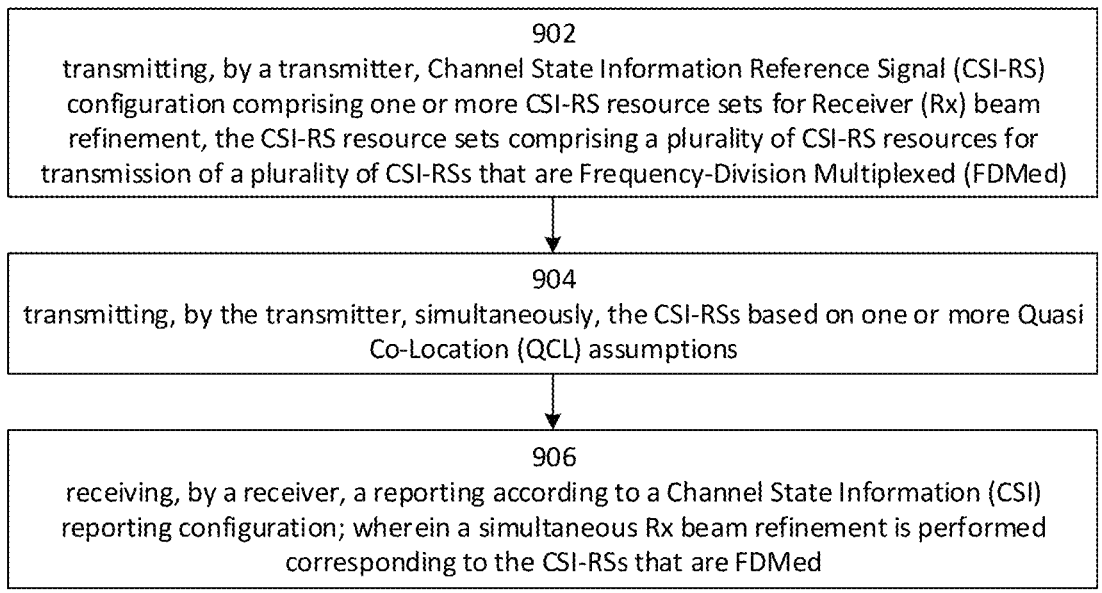
FIG. 9 is a flow chart illustrating steps of enhanced CSI-RS resource configuration and transmission for simultaneous UE Rx beam refinement by NE in accordance with some implementations of the present disclosure.

FIG. 9 is a flow chart illustrating steps of enhanced CSI-RS resource configuration and transmission for simultaneous UE Rx beam refinement by NE in accordance with some implementations of the present disclosure.

At step 902, the transmitter 312 of NE 300 transmits Channel State Information Reference Signal (CSI-RS) configuration comprising one or more CSI-RS resource sets for Receive (Rx) beam refinement, the CSI-RS resource sets comprising a plurality of CSI-RS resources for transmission of a plurality of CSI-RSs that are Frequency-Division Multiplexed (FDMed).

At step 904, the transmitter 312 of NE 300 transmits simultaneously, the CSI-RSs based on one or more Quasi Co-Location (QCL) assumptions.

At step 906, the receiver 314 of NE 300 receives a reporting according to a Channel State Information (CSI) reporting configuration; wherein a simultaneous Rx beam refinement is performed corresponding to the CSI-RSs that are FDMed.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. An apparatus, comprising:
   at least one memory; and
   at least one processor coupled with the at least one memory and configured to cause the apparatus to:
   receive a Channel State Information Reference Signal (CSI-RS) configuration comprising one or more CSI-RS resource sets for Receive (Rx) beam refinement, the CSI-RS resource sets comprising a plurality of CSI-RS resources for transmission of a plurality of CSI-RSs that are Frequency-Division Multiplexed (FDMed), wherein the at least one processor further receives, simultaneously, the CSI-RSs based on one or more Quasi Co-Location (QCL) assumptions;
   perform a simultaneous Rx beam refinement corresponding to the CSI-RSs that are FDMed; and
   transmit a reporting according to a Channel State Information (CSI) reporting configuration.

2. The apparatus of claim 1, wherein the CSI-RS configuration comprises one CSI-RS resource set, and the CSI-RS resource set comprises a plurality of CSI-RS resource groups, each group comprising a plurality of CSI-RS resources for transmission of a plurality of CSI-RSs that are FDMed.

3. The apparatus of claim 2, wherein the CSI-RS configuration further comprises a 'repetition' parameter set to 'partial on', indicating a same Transmitter (Tx) beam to be assumed for CSI-RSs with a same index in each CSI-RS resource group.

4. The apparatus of claim 1, wherein the CSI-RS configuration comprises one CSI-RS resource set, and each CSI-RS resource in the CSI-RS source set is configured with a plurality of QCL assumptions associated with a plurality of CSI-RS port groups, wherein each QCL assumption is associated with a CSI-RS port group.

5. The apparatus of claim 4, wherein each one of the CSI-RS port groups comprises one or two CSI-RS ports.

6. The apparatus of claim 4, wherein, in each CSI-RS resource, the CSI-RSs in the plurality of CSI-RS port groups are FDMed and transmitted simultaneously with different Tx beams.

7. The apparatus of claim 1, wherein the CSI-RS configuration comprises a plurality of CSI-RS resource sets, and it is not expected that the CSI-RS resources with a same index in each CSI-RS resource set are configured with different slots and Orthogonal Frequency Division Multiplexing (OFDM) symbols.

8. The apparatus of claim 1, wherein the CSI-RS configuration comprises a plurality of CSI-RS resource sets, and partial triggering of CSI-RSs on the plurality of CSI-RS resource sets is not expected.

9. The apparatus of claim 1, wherein the reporting comprises a CSI-RS resource group related index and corresponding Layer 1 Reference Signal Received Power (L1-RSRP) or Layer 1 Signal-to-Interference-Plus-Noise Ratio (L1-SINR); and the CSI-RS resource group related index comprises CSI-RS resource set index, or CSI-RS resource setting index, or CSI-RS port group index, or CSI-RS index in a group.

10. The apparatus of claim 1, wherein the reporting comprises L1-RSRP or L1-SINR concatenated according to a corresponding order of: CSI-RS resource set IDs, or CSI-RS port group indexes, or CSI-RS index in a group.

11. An apparatus, comprising:
at least one memory; and
at least one processor coupled with the at least one memory and configured to cause the apparatus to:
transmit a Channel State Information Reference Signal (CSI-RS) configuration comprising one or more CSI-RS resource sets for Receive (Rx) beam refinement,
wherein the CSI-RS configuration comprises one CSI-RS resource set, and each CSI-RS resource in the CSI-RS source set is configured with a plurality of QCL assumptions associated with a plurality of CSI-RS port groups, wherein each QCL assumption is associated with a CSI-RS port group, and
wherein the CSI-RS resource sets comprising a plurality of CSI-RS resources for transmission of a plurality of CSI-RSs that are Frequency-Division Multiplexed (FDMed),
transmit, simultaneously, the CSI-RSs based on one or more Quasi Co-Location (QCL) assumptions; and
receive a reporting according to a Channel State Information (CSI) reporting configuration.

12. The apparatus of claim 11, wherein the CSI-RS resource set comprises a plurality of CSI-RS resource groups, each group comprising a plurality of CSI-RS resources for transmission of a plurality of CSI-RSs that are FDMed.

13. The apparatus of claim 12, wherein the CSI-RS configuration further comprises a 'repetition' parameter set to 'partial on', indicating a same Transmitter (Tx) beam to be assumed for CSI-RSs with a same index in each CSI-RS resource group.

14. The apparatus of claim 11, wherein the CSI-RS configuration comprises a plurality of CSI-RS resource sets, and it is not expected that the CSI-RS resources with a same index in each CSI-RS resource set are configured with different slots and Orthogonal Frequency Division Multiplexing (OFDM) symbols.

15. The apparatus of claim 11, wherein the CSI-RS configuration comprises a plurality of CSI-RS resource sets, and partial triggering of CSI-RSs on the plurality of CSI-RS resource sets is not expected.

16. The apparatus of claim 11, wherein the reporting comprises a CSI-RS resource group related index and corresponding Layer 1 Reference Signal Received Power (L1-RSRP) or Layer 1 Signal-to-Interference-Plus-Noise Ratio (L1-SINR); and the CSI-RS resource group related index comprises CSI-RS resource set index, or CSI-RS resource setting index, or CSI-RS port group index, or CSI-RS index in a group.

17. The apparatus of claim 11, wherein the reporting comprises L1-RSRP or L1-SINR concatenated according to a corresponding order of: CSI-RS resource set IDs, or CSI-RS port group indexes, or CSI-RS index in a group.

18. A method, comprising:
receiving, by a receiver, Channel State Information Reference Signal (CSI-RS) configuration comprising one or more CSI-RS resource sets for Receive (Rx) beam refinement, the CSI-RS resource sets comprising a plurality of CSI-RS resources for transmission of a plurality of CSI-RSs that are Frequency-Division Multiplexed (FDMed);
receiving, by the receiver, simultaneously, the CSI-RSs based on one or more Quasi Co-Location (QCL) assumptions;
performing, by a processor, a simultaneous Rx beam refinement corresponding to the CSI-RSs that are FDMed; and
transmitting, by a transmitter, a reporting according to a Channel State Information (CSI) reporting configuration.

* * * * *